United States Patent [19]

Geiste et al.

[11] Patent Number: 4,854,651
[45] Date of Patent: Aug. 8, 1989

[54] VIDEO CASSETTE RECORDER PROTECTOR AND ORGANIZER

[76] Inventors: Douglas W. Geiste, 31 Roger Ave., North Haven, Conn. 06473; James C. Andrew, 409 Ocean Ave., West Haven, Conn. 06516

[21] Appl. No.: 69,849

[22] Filed: Jul. 6, 1987

[51] Int. Cl.$^4$ ............................................. A47B 81/06
[52] U.S. Cl. ........................................ 312/9; 206/387; 211/40; 312/279; 312/287; 312/328
[58] Field of Search ................. 312/7.2, 208, 330 R, 312/9, 330 SM, 10, 20, 21, 138 R, 279, 280, 286, 287, 328; 206/387; 211/40, 41

[56] References Cited

U.S. PATENT DOCUMENTS

| | | | |
|---|---|---|---|
| 3,666,337 | 5/1972 | Sztore | 312/330 R X |
| 4,440,458 | 4/1984 | Berkman | 312/330 R X |
| 4,577,914 | 3/1986 | Stravitz | 206/387 X |
| 4,684,027 | 8/1987 | Wright | 211/40 |
| 4,688,860 | 8/1987 | Accumanno et al. | 206/387 X |
| 4,708,408 | 11/1987 | Kennon | 206/387 X |

FOREIGN PATENT DOCUMENTS

| | | | |
|---|---|---|---|
| 2541878 | 9/1984 | France | 312/208 |
| 8501870 | 1/1987 | Netherlands | 206/387 |

Primary Examiner—Peter A. Aschenbrenner
Assistant Examiner—Thomas A. Rendos
Attorney, Agent, or Firm—John R. Doherty

[57] ABSTRACT

A device which provides protection from misuse and offers the convenience of accessory storage for a video cassette recorder, which is comprised of a main body that fits around the front portion of the video cassette recorder; a hinged and lockable front access door which can be opened to perform video cassette recorder functions and then closed and locked to prevent misuse by children; a storage compartment for information pertaining to the video cassette recorder; a compartment for remote control unit storage; and a video cassette storage rack for holding tapes.

3 Claims, 1 Drawing Sheet

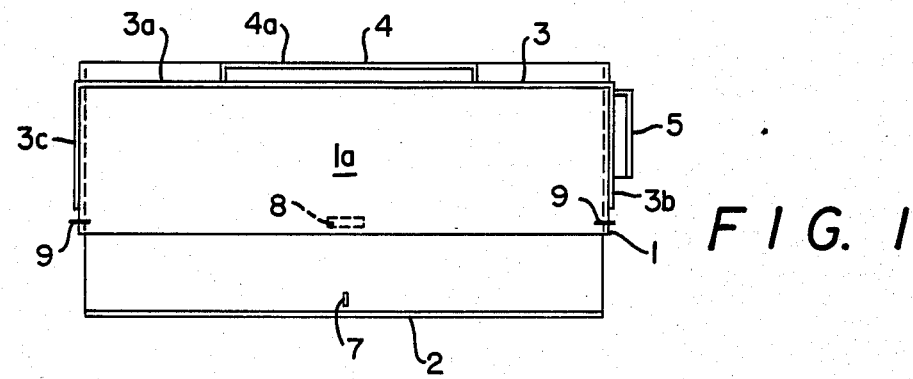
FIG. 1
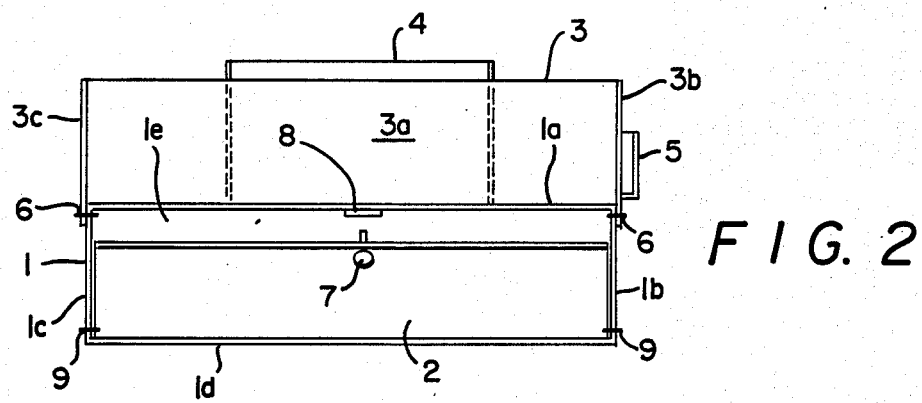
FIG. 2
FIG. 3
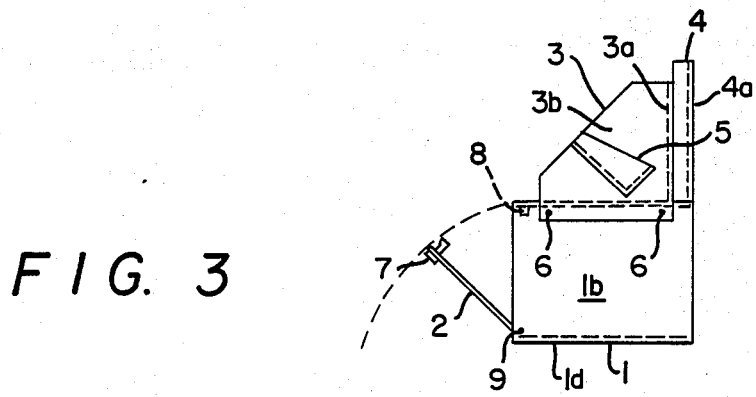

VIDEO CASSETTE RECORDER PROTECTOR AND ORGANIZER

BACKGROUND OF THE INVENTION

1. Field of the Invention

The invention relates to a device for protecting video cassette recorder controls and programs from accidental misuse from young children while also providing convenient areas to store cassette tapes, owner's manual, and remote control unit when not in use.

2. Description of Prior Art

Video cassette recorders currently being manufactured do not provide adequate protection from accidental misuse of the video cassette recorder's front programming control area. Children are frequently jambing foreign objects into the cassette compartment and changing programmed functions by touching various controls, both of which can result in costly repairs to the video cassette recorder.

Also, video cassette recorder manufacturers do not currently provide compartments for storage of cassette tapes, owner's manual, warranties, video programming guide, or remote control units.

SUMMARY OF THE INVENTION

This invention provides a device for protecting the front control area of a video cassette recorder and for storing and organizing video cassette tapes, which comprises, in combination:

(a) a main body including a top panel and two side panels adapted to fit around the front end portion of the video cassette recorder adjacent to the front control area thereof, the main body having an open front end exposing the front control area, (b) a front access door covering the open front end of the main body;

(c) means for hingably attaching the front access door to the main body so that the door can be opened to expose the front control area of the video cassette recorder;

(d) means for locking the door in place when covering the front control area; and (e) a rack for storing and organizing video cassette tapes on top of the video cassette recorder including a back wall and two side walls, the back wall standing upright on the top panel at a location remote from the open front end of the main body, providing together with the two side walls an open storage space in front of the back wall for receiving the video cassette tapes.

BRIEF DESCRIPTION OF DRAWINGS

FIG. 1 is a top plan view of a device embodying the invention;

FIG. 2 is a front view of the device shown in FIG. 1; and

FIG. 3 is a side view of the same device.

DESCRIPTION OF THE PREFERRED EMBODIMENT

Referring to FIGS. 1-3 of the drawing, there is shown a video cassette recorder protector and organizer device embodying the invention. As shown, the device includes a hard plastic main body 1 including a rectangular top panel 1a, two side panels 1b and 1c, respectively and a rectangular bottom panel 1d, the top, side and bottom panels being proportioned so as to fit around the front end portion of a video cassette recording (not shown). The main body 1 has an open front end 1e exposing the front control panel (not shown) of the video cassette recorder. An optically clear front excess door 2 is hinged to the two side panels 1b and 1c and covers the open front end 1e of the main body 1, protecting the front control area of the recorder from accidental damage or misuse.

A cassette storage rack 3 is mounted on top of the main body 1 and includes a back wall 3a and two side walls 3b and 3c, respectively. The back wall 3a stands upright on the top panel 1a at a location remote from the open front end 1e of the main body 1, that is, close to the back edge of the top panel 1a, providing together with the top panel 1a and the two side walls 3b and 3c an open storage area in front of the back wall 3a for storing and organizing video cassette tapes (not shown) on top of the video cassette recorder.

A narrow, rectangular storage compartment 4 is provided on the back of the rack 3 for storage of a video cassette recorder operation manual, warranties, video program guides and the like. The compartment 4 is formed by a rear panel 4a mounted onto the rear side of the back wall 3a.

A holder 5 may be molded onto one of the side walls 3b of the rack 3 for storing the remote control unit (not shown) of the video cassette recorder when not in use. The holder 5 may be rectangular in shape and is inclined at an angle rearwardly toward the back wall 3a so that when the control unit is stored therein it will not interfere with placement of the cassette tapes in the storage area provided by the rack 3.

The two side walls 3b and 3c of the rack 3 extend below the top panel 1a a short distance over the two side panels 1b and 1c, respectively, and are fastened thereto by four bolts 6. By removing the two front bolts 6, the rack 3 can be swung down to allow for more compact shipping.

A lock mechanism 7, eg. a quarter turn lock, is positioned through the front access door 2 at the top edge thereof and engages a stop or latch 8 which is molded onto the bottom surface of the top panel 1a at its center opposite the lock 7. By this construction, the door 2 can be opened to perform video cassette recorder functions and then closed and locked by the lock mechanism 7 to latch 8 in order to prevent damage or misuse of the video cassette recorder.

The front door 2 is hingably attached to the two side panels 1b and 1c of the main body 1 by two pin type hinges 9 molded onto the lower side edges of the door 2. The hinges 9 fit into corresponding holes provided within the two side panels 1b and 1c at a point adjacent to the bottom panel 1d to form pivot points for swinging the door downward to open the door and upward to close the door.

I claim:

1. A device for protecting a video cassette recorder and for storing and organizing video cassette tapes comprising, in combination:

(a) a main body including a top and a bottom panel and two side panels forming an enclosure for receiving said video cassette recorder, said main body having an open front end and said top panel having a front edge adjacent to said open front end and a back edge;

(b) an optically clear, front access door covering said open front end of said main body;

(c) means for hingably attaching said front access door to said two side panels at a point adjacent to said bottom panel so that said door can be swung downward to expose said open front end;

(d) a locking mechanism on said front door adapted to engage a latch on the bottom of said top panel adjacent to said front edge thereof;

(e) a rack for storing and organizing video cassette tapes positioned on top of said main body including a back wall and two side walls, said back wall standing upright on said top panel at a location close to said back edge thereof, providing together with said top panel and said side walls an open storage space in front of said back wall for receiving said video cassette tapes;

(f) means for mechanically fastening said two side walls of said rack to said two side panels of said main body;

(g) a rear wall member affixed to the back of said back wall of said rack forming a separate storage compartment; and (h) a holder affixed to one of said side walls of said rack for holding a remote control unit for said video cassette recorder.

2. A device according to claim 1, wherein said front access door is hingably attached to said two side panels by pin type hinges molded onto said door and fitting into corresponding holes formed within the lower edge of said side panels.

3. A device according to claim 1, wherein said side walls of said rack are mechanically fastened by bolts to said side panels of said main body.

* * * * *